United States Patent
Han (10) Patent No.: US 7,313,413 B2
(45) Date of Patent: Dec. 25, 2007

(54) RADIO FREQUENCY RECEIVING APPARATUS AND METHOD OF MOBILE COMMUNICATION TERMINAL

(75) Inventor: Jeong-Seok Han, Seoul (KR)

(73) Assignee: LG Electronics Inc., Seoul (KR)

( * ) Notice: Subject to any disclaimer, the term of this patent is extended or adjusted under 35 U.S.C. 154(b) by 439 days.

(21) Appl. No.: 10/888,174

(22) Filed: Jul. 9, 2004

(65) Prior Publication Data

US 2005/0009482 A1 Jan. 13, 2005

(30) Foreign Application Priority Data

Jul. 9, 2003 (KR) ...................... 10-2003-0046447

(51) Int. Cl.
 H04M 1/00 (2006.01)
 H04B 1/06 (2006.01)
 H04B 1/10 (2006.01)

(52) U.S. Cl. ................ 455/553.1; 455/277.2; 455/296

(58) Field of Classification Search ............ 455/552.1, 455/553.1, 132, 133, 227, 266, 275, 277.1, 455/277.2, 286, 287
See application file for complete search history.

(56) References Cited

U.S. PATENT DOCUMENTS

| | | | | |
|---|---|---|---|---|
| 5,361,403 A | * | 11/1994 | Dent | 455/74 |
| 5,771,026 A | * | 6/1998 | Stengel, Jr. | 343/858 |
| 6,097,974 A | | 8/2000 | Camp, Jr. et al. | 455/575 |
| 6,104,356 A | * | 8/2000 | Hikuma et al. | 343/853 |
| 6,246,376 B1 | * | 6/2001 | Bork et al. | 343/760 |
| 6,298,243 B1 | * | 10/2001 | Basile | 455/552.1 |
| 6,327,473 B1 | | 12/2001 | Soliman et al. | 455/456.1 |
| 6,351,236 B1 | * | 2/2002 | Hasler | 342/357.09 |
| 6,400,963 B1 | * | 6/2002 | Glockler et al. | 455/553.1 |
| 6,442,375 B1 | * | 8/2002 | Parmentier | 455/78 |
| 6,567,653 B1 | * | 5/2003 | Sanders | 455/126 |
| 6,662,021 B2 | * | 12/2003 | Kang et al. | 455/553.1 |
| 6,667,723 B2 | * | 12/2003 | Forrester | 343/858 |
| 6,957,080 B2 | * | 10/2005 | Guetre et al. | 455/552.1 |
| 6,961,019 B1 | * | 11/2005 | McConnell et al. | 342/357.1 |
| 7,071,776 B2 | * | 7/2006 | Forrester et al. | 330/129 |
| 7,171,235 B2 | * | 1/2007 | Haapoja | 455/553.1 |
| 2003/0100333 A1 | | 5/2003 | Standke et al. | 455/552 |
| 2003/0157907 A1 | * | 8/2003 | Leinonen et al. | 455/115 |

FOREIGN PATENT DOCUMENTS

EP 1 152 254 A2 11/2001

(Continued)

*Primary Examiner*—Duc Nguyen
(74) *Attorney, Agent, or Firm*—Lee, Hong, Degerman, Kang & Schmadeka (57) ABSTRACT

An RF (Radio Frequency) receiving apparatus and method of a mobile communication terminal are disclosed to perform a GPS signal receiving function for a position tracking service while minimizing interference from a telecommunication signal. The RF receiving apparatus includes a first RF matching unit for RF-matching the telecommunication signal without a change in power strength and a second RF matching unit for RF-matching a telecommunication signal while reducing power strength. When a position tracking service is requested, the first RF matching unit or the second RF matching unit is selected as an RF matching path of the telecommunication signal according to the power strength of the received signal. Thus, with interference or influence of the telecommunication signal minimized, a GPS signal is received and therefore a satellite search performance of the mobile communication terminal is enhanced.

19 Claims, 4 Drawing Sheets

FOREIGN PATENT DOCUMENTS

| | | |
|---|---|---|
| JP | 59-097232 | 6/1984 |
| JP | 10-290177 | 10/1998 |
| JP | 2000-315960 | 11/2000 |
| JP | 2002-163742 | 6/2002 |
| JP | 2002-190748 | 7/2002 |
| JP | 2002-354073 | 12/2002 |
| JP | 2003-139839 | 5/2003 |
| KR | 10-2003-007350 | 1/2003 |
| WO | WO 03/005056 | 1/2003 |

\* cited by examiner

RADIO FREQUENCY RECEIVING APPARATUS AND METHOD OF MOBILE COMMUNICATION TERMINAL

CROSS-REFERENCE TO RELATED APPLICATIONS

Pursuant to 35 U.S.C. § 119(a), this application claims the benefit of earlier filing date and right of priority to Korean Application No. 2003-46447, filed on Jul. 9, 2003, the contents of which are hereby incorporated by reference herein in their entirety.

BACKGROUND OF THE INVENTION

1. Field of the Invention

The present invention relates to an RF (Radio Frequency) receiving apparatus and method of a mobile communication terminal capable of performing both a GPS (Global Positioning System) function and a telecommunication function.

2. Description of the Related Art

A position tracking service is a service for automatically checking and tracking a position of a mobile communication terminal on a real time basis by using propagation detecting characteristics through a base station of a telecommunication network such as a CDMA-based mobile communication network. In the CDMA (Code Division Multiple Access) network, the position tracking service is made such that a position of the mobile communication terminal is detected and tracked by using a GPS and a mobile communication network.

E911 (Emergency 911) service is an example of a position tracking service using a CDMA network wherein a position of a mobile communication terminal capable of receiving a GPS signal is checked and an emergency rescue agency, such as a fire station, is informed of the checked position.

In order to provide the E911 service, the mobile communication terminal includes an antenna and a GPS receiver available for receiving a GPS signal. A position determination entity (PDE) calculates a position of the mobile communication terminal by using information received by the GPS receiver of the mobile communication terminal.

In case of an RF receiver of a mobile communication terminal performing both a GPS function and a CDMA function, the receiver has a GPS path for a GPS RF signal and a CDMA path for a CDMA RF signal.

Figure 1:
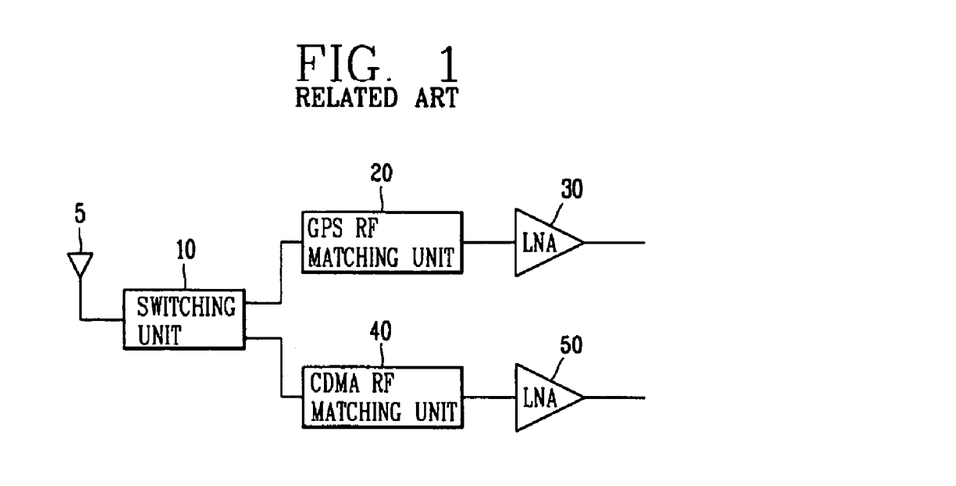
FIG. 1 illustrates the construction of an RF receiver of a general mobile communication terminal.

FIG. 1 illustrates the construction of an RF receiver of a general mobile communication terminal.

As shown in FIG. 1, the RF receiver of the general mobile communication terminal includes an antenna 5 having GPS signal frequency band characteristics and CDMA signal frequency band characteristics, a switching unit 10 for separating a GPS signal and a CDMA signal received from the antenna 5, a GPS RF matching unit 20 for performing an RF matching function of the GPS signal transmitted from the switching unit 10, a first LNA (Low Noise Amplifier) 30 for amplifying the GPS signal outputted from the GPS RF matching unit 20, a CDMA RF matching unit 40 for performing an RF matching function of the CDMA signal transmitted from the switching unit 10, and a second LNA 50 for amplifying the CDMA signal outputted from the CDMA RF matching unit 40.

Figure 2A:
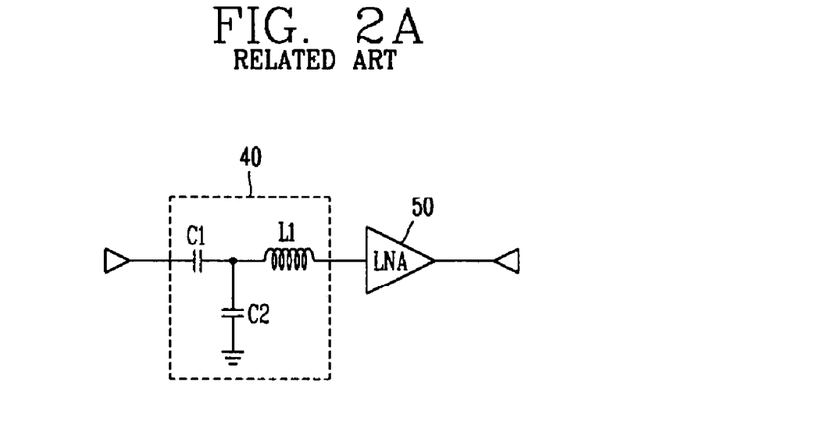
FIG. 2A illustrates one example of a general CDMA RF matching unit.

As shown in FIG. 2A, the CDMA RF matching unit 40 can include condensers C1 and C2 and a coil L1.

Figure 2B:
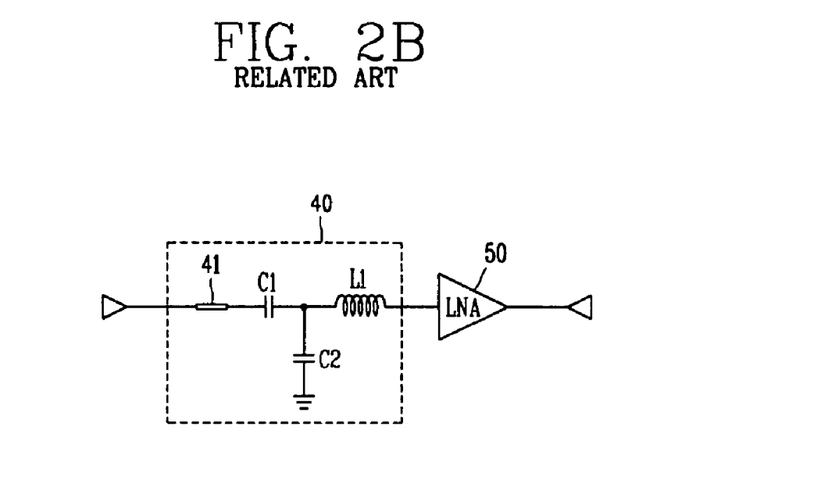
FIG. 2B illustrates another example of the general CDMA RF matching unit.

As shown in FIG. 2B, the CDMA RF matching unit 40 can additionally include a PCB line 41 having a certain characteristic impedance value, such as 50Ω, for example.

When a position tracking service such as an E911 for a GPS ONE function is requested by a user, a mobile communication terminal searches satellites for the E911 service while performing a switching between the GPS path and the CDMA path through the switching unit 10.

After, the GPS signals including position information and satellite numbers of satellites are received by the antenna 5 of the mobile communication terminal, and then switched to the GPS path by the switching unit 10.

The mobile communication terminal calculates a pseudo-range of positions by using the GPS signals and transmits calculated pseudo-range information and position information of satellites to the PDE or a position calculating base station through the CDMA channel.

The PDE or the position calculating base station calculates a position of the mobile communication terminal by using the pseudo-range information transmitted from the mobile communication terminal and the position information of satellites, and informs an emergency rescue agency of the calculated position of the mobile communication terminal.

However, when the E911 service function of the general mobile communication terminal is operated, the RF receiver of the mobile communication terminal uses both the CDMA mode function and the GPS mode function in a hybrid form. Thus, if the power strength of a CDMA signal becomes high, the CDMA signal would affect the GPS path and cause problems. For example, receiver sensitivity of the GPS signal would be degraded and satellite search performance of the mobile communication terminal would deteriorate. Deterioration of the satellite search performance would then lead to an inaccurate calculation of user position in an emergency situation.

Thus, what is needed is an RF receiver operating in both a CDMA mode function and a GPS mode function capable of minimizing the effects of a CDMA signal on the performance of the GPS mode function.

SUMMARY OF THE INVENTION

An object of the present invention is to provide an RF receiving apparatus and method of a mobile communication terminal capable of minimizing interference of a telecommunication signal affecting a GPS mode performance when a position tracking service function is performed on an RF path.

In one aspect, to achieve at least the above objects in whole or in parts, there is provided an RF receiving apparatus of a mobile communication terminal comprising a controller for checking a power strength of a signal and controlling a switching operation of an RF matching path according to the power strength of the signal, a switch controlled by the controller for switching the signal between a first RF matching unit and a second RF matching unit according to the power strength of the signal, the first RF matching unit RF-matching the signal without changing the power strength of the signal, the second RF matching unit RF-matching the signal and reducing the power strength of the signal to a prescribed level, and an amplifier for amplifying the signal outputted from the first RF matching unit and amplifying the signal outputted from the second RF matching unit.

The controller compares the power strength of the signal to a reference power strength, wherein if the power strength of the signal is larger than the reference power strength, the controller outputs a first switching control signal to the switch for switching the signal to the second RF matching unit.

When the second RF matching unit is selected by the switch, a GPS signal is received, and when a pseudo-range of a mobile communication terminal is calculated by using the received GPS signal, the controller outputs a second switching control signal to the switch for selecting the first RF matching unit.

If the power strength of the signal is smaller than the reference power strength, the controller outputs a third switching control signal to the switch for switching the signal to the first RF matching unit.

In a more detailed aspect, the RF receiving apparatus of a mobile communication terminal further comprises a switching unit controlled by the controller for separating a GPS signal and a CDMA signal received from an antenna, a GPS RF matching unit for RF-matching the GPS signal separated in the switching unit, and a GPS signal amplifier for amplifying the GPS signal outputted from the GPS RF matching unit.

To achieve at least these advantages in whole or in parts, there is further provided an RF receiving method of a mobile communication terminal comprising a step in which a power strength of a signal is checked, a step in which if the signal is determined not to interfere with or affect a GPS RF reception performance, an RF matching path of the signal is maintained as a first path, and a step in which if the signal is determined to interfere with or affect the GPS RF reception performance, the RF matching path of the signal is switched to a second path.

The second path is an RF matching path for performing an RF-matching function while reducing the power strength of the signal to a prescribed level.

The first path is an RF matching path for performing an RF-matching function without changing the power strength of the signal.

The second path includes a PCB line having a greater characteristic impedance than a characteristic impedance of a PCB line of the first path.

In a further aspect, the RF receiving method of a mobile communication terminal further comprises receiving GPS satellite information through a GPS RF reception path wherein interference of the signal with the GPS RF reception performance is minimized, calculating a pseudo-range of the mobile communication terminal by using the GPS satellite information, transmitting the pseudo-range and the GPS satellite information from the mobile communication terminal to a position calculating base station; and switching the RF matching path of the CDMA signal to the first path.

In a further aspect, an RF receiving apparatus of a mobile communication terminal comprises a controller for checking a power strength of a CDMA signal and controlling a switching operation of a CDMA RF matching path according to the power strength of the CDMA signal, a switch controlled by the controller for switching the CDMA signal between a first CDMA RF matching unit and a second CDMA RF matching unit according to the power strength of the CDMA signal, the first CDMA RF matching unit RF-matching the CDMA signal without changing changing the power strength of the CDMA signal, the second CDMA RF matching unit RF-matching the CDMA signal and reducing the power strength of the CDMA signal to a prescribed level, and an LNA (Low Noise Amplifier) for amplifying the CDMA signal outputted from the first CDMA RF matching unit and amplifying the CDMA signal outputted from the second CDMA RF matching unit.

Additional advantages, objects, and features of the invention will be set forth in part in the description which follows and in part will become apparent to those having ordinary skill in the art upon examination of the following or may be learned from practice of the invention. The objects and advantages of the invention may be realized and attained as particularly pointed out in the appended claims.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. Features, elements, and aspects of the invention that are referenced by the same numerals in different figures represent the same, equivalent, or similar features, elements, or aspects in accordance with one or more embodiments.

DETAILED DESCRIPTION OF THE PREFERRED EMBODIMENTS

Figure 3:
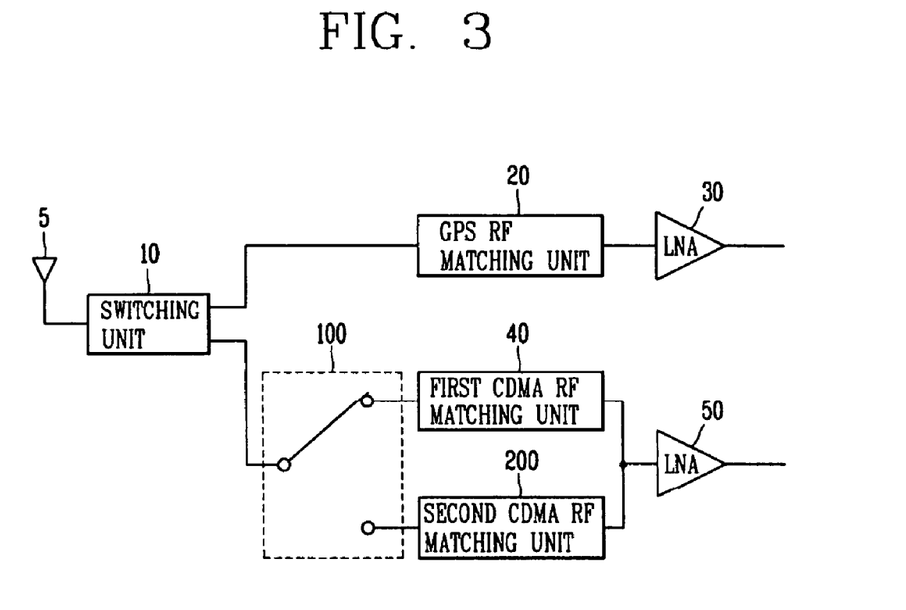
FIG. 3 illustrates the construction of an RF receiving apparatus of a mobile communication terminal in accordance with a preferred embodiment of the present invention.

The present invention relates to an RF receiving apparatus and method of a mobile communication terminal capable of minimizing interference of a telecommunication signal on a GPS signal receiving function. As shown in FIG. 3, the RF receiving apparatus of a mobile communication terminal in accordance with the present invention preferably comprises an antenna 5 having GPS signal frequency band characteristics and CDMA signal frequency band characteristics, a switching unit 10 for separating a GPS signal and a CDMA signal received from the antenna 5 according to an operation mode of the mobile communication terminal, a GPS RF matching unit 20 for performing an RF matching function on the GPS signal transmitted from the switching unit 10, a first LNA (Low Noise Amplifier) 30 for amplifying the GPS signal outputted from the GPS RF matching unit 20, a switch 100 for switching the CDMA signal between a first CDMA RF matching unit 40 and a second CDMA RF matching unit 200 according to a power strength of the CDMA signal transmitted from the switching unit 10, the first CDMA RF matching unit 40 for RF-matching the switched CDMA signal without changing its power strength, the second CDMA RF matching unit 200 for RF-matching the switched CDMA signal and reducing its power strength and a second LNA 50 for amplifying the CDMA signal outputted from the first CDMA RF matching unit 40 and amplifying the CDMA signal from the second CDMA RF matching unit 200.

When the operation mode of the mobile communication terminal is changed from a CDMA mode to a GPS mode, a controller such as a mobile station modem (MSM) of the mobile communication terminal checks a power strength of the CDMA signal received on the RF path and controls a switching operation of the switch 100 according to the power strength of the CDMA signal.

Figure 4:
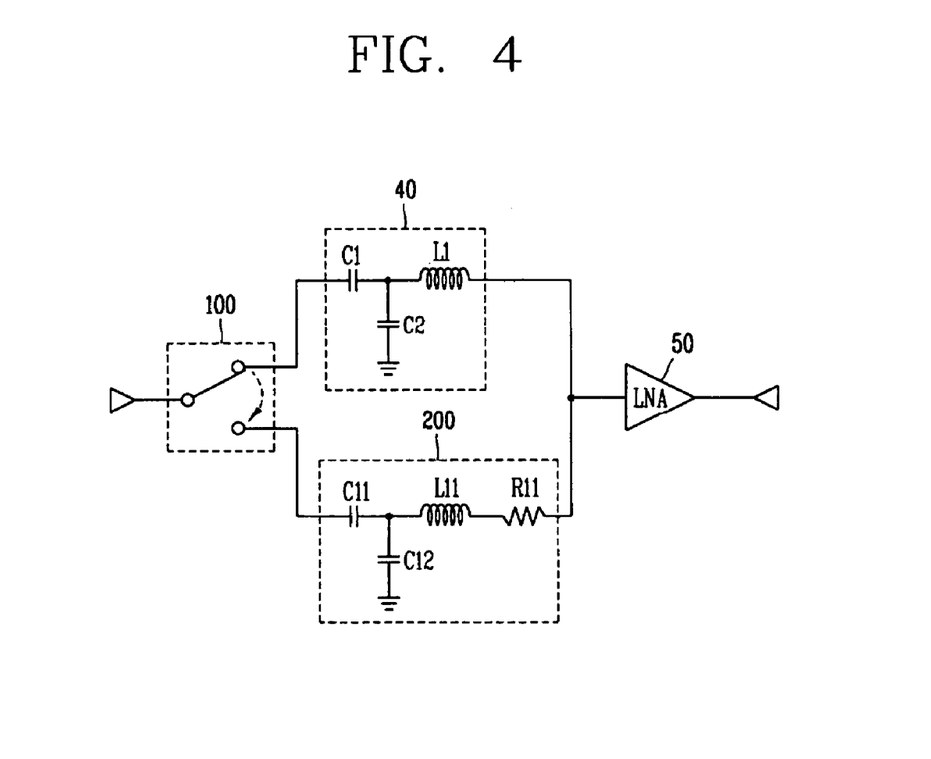
FIG. 4 illustrates one example of a CDMA RF matching unit in accordance with the preferred embodiment of the present invention.

As shown in FIG. 4, the first CDMA RF matching unit 40 preferably comprises a first condenser C1 connected in series to a first output pin of the switch 100, a first coil L1 connected in series between the first condenser C1 and the second LNA 50, and a second condenser C2 connected between a contact point of the first condenser C1 and the first coil L1 and a ground point.

Further referring to FIG. 4, the second CDMA RF matching unit 200 preferably comprises a third condenser C11 connected in series to a second output pin of the switch 100, a second coil L11 connected in series to the third condenser C11, a fourth condenser C12 connected between a contact point of the third condenser C11 and the second coil L11 and a ground point, and a resistor R11 connected in series between the second coil L11 and the second LNA 50.

Because of the resistor R11, the power strength of the CDMA signal passing through the second CDMA RF matching unit 200 is reduced. Hence, the second CDMA RF matching unit 200 performs an RF matching function while reducing the power strength of the CDMA signal. The resistor R11 for reducing the power strength of the CDMA signal is designed not to affect the CDMA mode performance.

Figure 5:
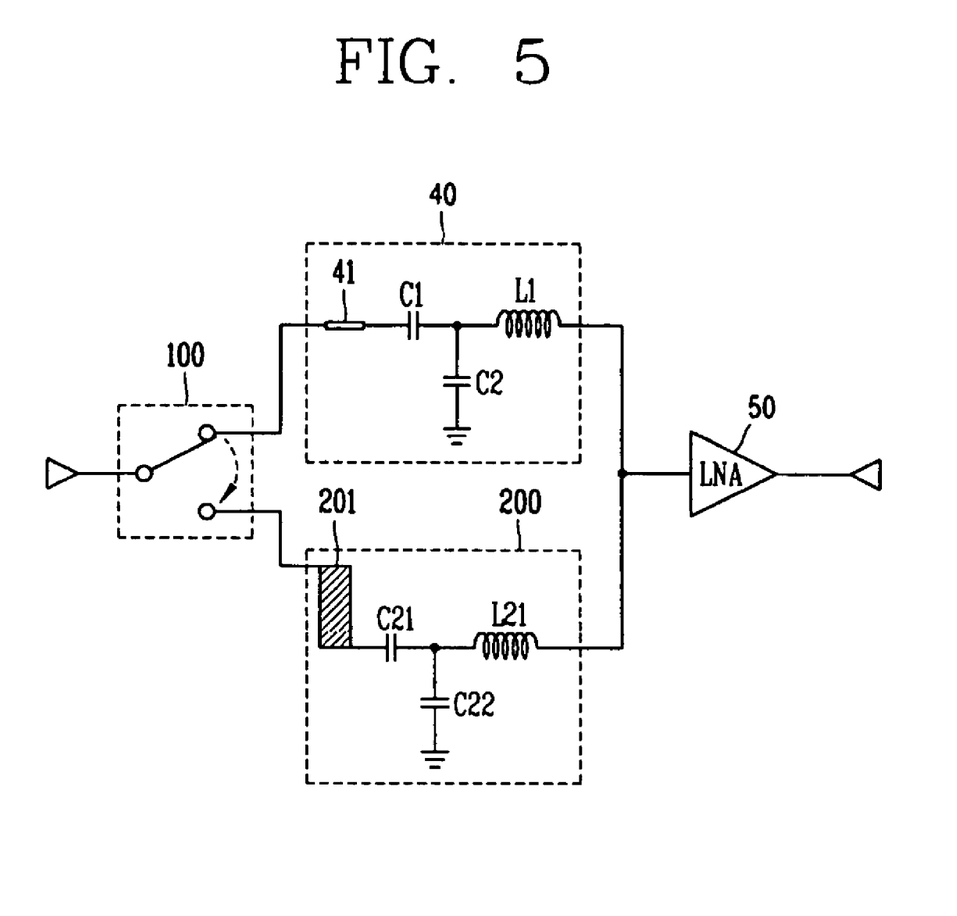
FIG. 5 illustrates another example of a CDMA RF matching unit in accordance with the preferred embodiment of the present invention.

The first CDMA RF matching unit 40 and the second CDMA RF matching unit 200 can be implemented as shown in FIG. 5.

With reference to FIG. 5, the first CDMA RF matching unit 40 preferably comprises a first PCB line connected in series to a first output pin of the switch 100 and having a first characteristic impedance, a first condenser C1 connected in series to the first PCB line 41, a first coil L1 connected in series between the first condenser C1 and the second LNA 50, and a second condenser C2 connected between a contact point of the first condenser C1 and the first coil L1 and a ground point.

Further referring to FIG. 5, the second CDMA RF matching unit 200 preferably comprises a second PCB line 201 connected in series to a second output pin of the switch 100 and having a second characteristic impedance, a third condenser C21 connected in series to the second PCB line, a second coil L21 connected in series between the third condenser C21 and the second LNA 50, and a fourth condenser C22 connected between a contact point of the third condenser C21 and the second coil L21 and the ground point.

The first characteristic impedance of the first PCB line 41 is preferably a small value so as not to change the power strength of the CDMA signal. In contrast, the second characteristic impedance of the second PCB line 201 is preferably a large value so as to reduce the power strength of the CDMA signal which is greater than a reference power strength. The second PCB line 201 is designed not to affect performance of the CDMA mode. The reference power strength signifies a power strength at which the power strength of the CDMA signal affects performance of the GPS mode.

Preferably, the RF receiving apparatus of a mobile communication terminal constructed as described above operates as follows.

Figure 6:
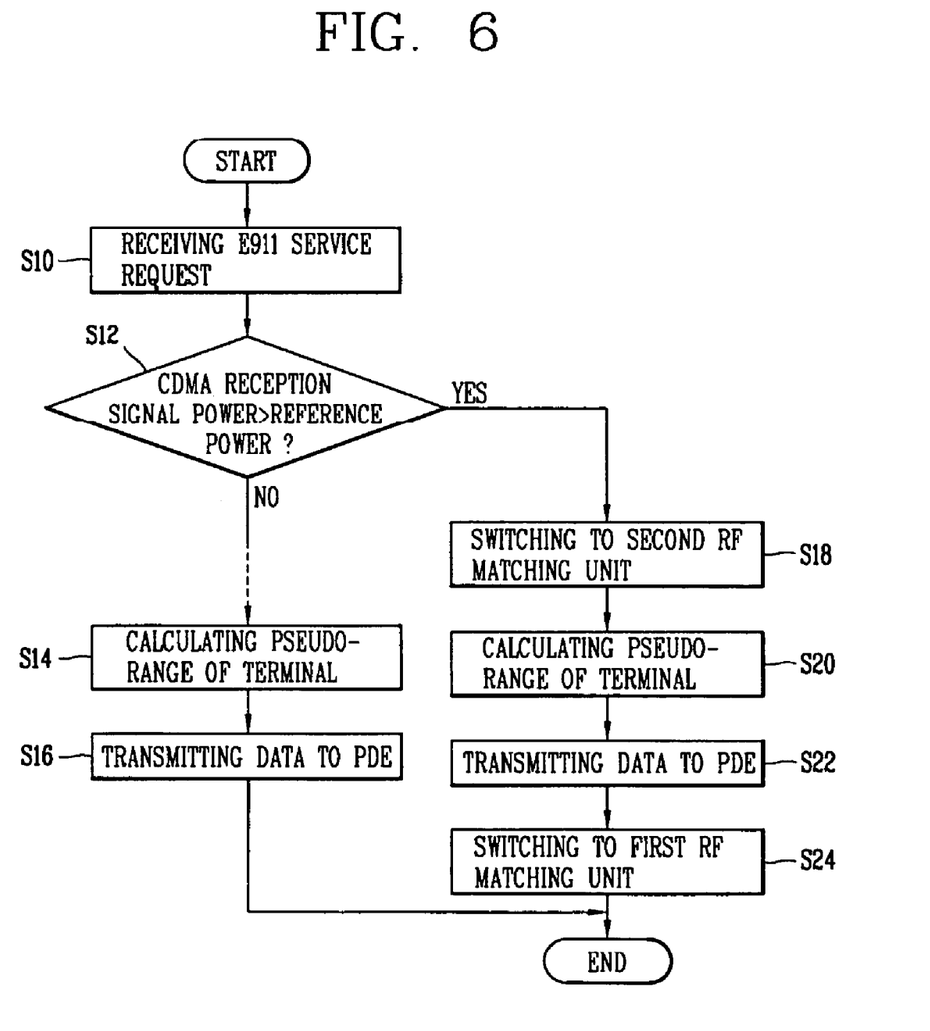
FIG. 6 is a flow chart of an RF receiving method of a mobile communication terminal in accordance with the preferred embodiment of the present invention.

Referring to FIG. 6, when a position tracking service such as an E911 service is requested by a user (step S10), a controller of a mobile communication terminal, namely, the MSM, changes an operation mode from the CDMA mode to the GPS mode and compares a detected power strength of a CDMA signal with a reference power strength (step S12). According to the change in the operation mode of the mobile communication terminal, the switching unit 10 switches an RF path from the CDMA path to the GPS path. The detected CDMA signal is a CDMA signal received right before the RF path is switched to the GPS path by the switching unit 10.

If the power strength of the CDMA signal is smaller than the reference power strength, the MSM determines that the power strength of the CDMA reception signal does not interfere with or affect the GPS mode performance and maintains an operation state of the switch 100. Accordingly, the switch 100 maintains the state that the input pin and the first output pin are connected, whereby the first CDMA RF matching unit 40 is maintained in a selected state.

The MSM of the mobile communication terminal calculates a pseudo-range of positions of the mobile communication terminal by using the GPS signal received through the antenna 5, the switching unit 10, the GPS RF matching unit 20 and the first LNA 30 (step S14), and transmits the calculated pseudo-range information of the mobile communication terminal and the received GPS signal to a PDE or a position calculating base station through a CDMA transmission channel (step S16).

If, however, the power strength of the CDMA signal is larger than the reference power strength, the MSM determines that the power strength of the CDMA reception signal interferes with or affects the GPS mode performance and controls the switching operation of the switch 10. Accordingly, the switch 100 switches the input pin from the first output pin to the second output pin, so that an output signal of the switching unit 10 can be transmitted to the second CDMA RF matching unit 200 (step S18).

Thus, an RF receiving circuit can receive the GPS signal in a state where interference or influence of the CDMA signal on the GPS mode function has been minimized, so that a GPS satellite can be more accurately searched.

The MSM of the mobile communication terminal calculates a pseudo-range of the mobile communication terminal by using the GPS signal received through the GPS path in the state that interference or influence of the CDMA signal has been minimized (step S20), and transmits the calculated pseudo-range information of the mobile communication terminal and the received GPS signal to the PDE through the CDMA transmission channel (step S22).

Thereafter, the MSM switches the state of the switch 100 to its original state. The switch 100 switches the input pin to the first output pin, whereby the CDMA path is selected by the first CDMA RF matching unit 40 (step S24). Accordingly, when the CDMA signal having a quite high strength is received, the RF receiving circuit of the mobile communication terminal performs the RF matching function while reducing the power strength of the CDMA signal, whereby interference or influence of the CDMA signal on the GPS sensitivity can be prevented.

As so far described, the RF receiving apparatus and method of a mobile communication terminal have many advantages.

When the operation mode of the mobile communication terminal is changed from the CDMA mode to the GPS mode, the power strength of the CDMA reception signal is checked, and if the power strength of the CDMA signal is greater than a reference power strength which interferes or affects GPS performance, an RF matching path for reducing the power strength of the CDMA signal is selected. Therefore, the interference or influence of the CDMA signal to the GPS performance can be minimized.

Further, since the GPS signal is received after minimizing the interference or influence of the CDMA signal, a GPS satellite can be searched under an optimum condition. Accordingly, thanks to enhancement of the performance for searching the GPS satellite, a pseudo-range of a mobile communication terminal can be more accurately calculated.

Moreover, by transmitting the GPS signal received under the optimum condition of an RF path of the mobile communication terminal and the accurately calculated pseudo-range information to the PDE, the PDE can accurately track a position of the mobile communication based on the information received from the mobile communication terminal.

The foregoing embodiments and advantages are merely exemplary and are not to be construed as limiting the present invention. The present teaching can be readily applied to other types of apparatuses. The description of the present invention is intended to be illustrative, and not to limit the scope of the claims. Many alternatives, modifications, and variations will be apparent to those skilled in the art. In the claims, means-plus-function clauses are intended to cover the structure described herein as performing the recited function and not only structural equivalents but also equivalent structures.

What is claimed is:

1. An RF receiving apparatus of a mobile communication terminal comprising:
   a controller for controlling a switching operation of an RF matching path of a signal; and
   a switch controlled by the controller for switching the signal between a first RF matching unit and a second RF matching unit;
   the first RF matching unit RF-matching the signal;
   the second RF matching unit RF-matching the signal;
   wherein the controller checks a power strength of the signal and compares the power strength of the signal to a reference power strength, wherein if the power strength of the signal is larger than the reference power strength, the controller outputs a first switching control signal to the switch for switching the signal to the second RF matching unit;
   wherein the reference power strength is set at a level at which the signal interferes with GPS RF reception performance;
   wherein the first RF matching unit comprises a first PCB line connected in series to a first output of the switch and having a first characteristic impedance, and the second RF matching unit comprises a second PCB line connected in series to a second output of the switch and having a second characteristic impedance, wherein the second characteristic impedance is greater than the first characteristic impedance.

2. The apparatus of claim 1, wherein the controller controls the switching operation of the RF matching path according to the power strength of the signal.

3. The apparatus of claim 1, wherein the first RF matching unit RF-matches the signal without changing the power strength of the signal.

4. The apparatus of claim 1, wherein the second RF matching unit RF-matches the signal and reduces the power strength of the signal to a prescribed level.

5. The apparatus of claim 1, wherein the signal is a telecommunication signal used in a CDMA network.

6. The apparatus of claim 1, further comprising an amplifier for amplifying the signal outputted from the first RF matching unit and amplifying the signal outputted from the second RF matching unit.

7. The apparatus of claim 6, wherein the first RF matching unit comprises:
   a first condenser connected in series to a first output of the switch;
   a first coil connected in series between the first condenser and the amplifier; and
   a second condenser connected between a contact point of the first condenser and the first coil and a ground point.

8. The apparatus of claim 7, wherein the second RF matching unit comprises:
   a third condenser connected in series to a second output of the switch;
   a second coil connected in series to the third condenser;
   a fourth condenser connected between a contact point of the third condenser and the second coil and a ground point; and
   a resistor connected in series between the second coil and the amplifier.

9. The apparatus of claim 6, wherein the first RF matching unit further comprises:
   a first condenser connected in series to the first PCB line;
   a first coil connected in series between the first condenser and the amplifier; and
   a second condenser connected between a contact point of the first condenser and the first coil and a ground point.

10. The apparatus of claim 9, wherein the second RF matching unit further comprises:
    a third condenser connected in series to the second PCB line;
    a second coil connected in series between the third condenser and the amplifier; and
    a fourth condenser connected between a contact point of the third condenser and the second coil and the ground point.

11. The apparatus of claim 1, wherein when the second RF matching unit is selected by the switch, the controller outputs a second switching control signal to the switch for selecting the first RF matching unit if a pseudo-range of a mobile communication terminal is calculated by using a received GPS signal.

12. The apparatus of claim 1, wherein if the power strength of the signal is smaller than the reference power strength, the controller outputs a third switching control signal to the switch for switching the signal to the first RF matching unit.

13. The apparatus of claim 1, further comprising:
    a switching unit controlled by the controller for separating a GPS signal and a telecommunication signal received from an antenna;
    a GPS RF matching unit for RF-matching the GPS signal separated in the switching unit; and
    a GPS signal amplifier for amplifying the GPS signal outputted from the GPS RF matching unit.

14. An RF receiving method of a mobile communication terminal comprising:
    checking a power strength of a signal when a position tracking service is requested;
    maintaining an RF matching path of the signal as a first path, if the signal is determined not to interfere with a GPS RF reception performance; and switching the RF matching path of the signal to a second path, if the signal is determined to interfere with the GPS RF reception performance;

wherein the second path includes a PCB line having a greater characteristic impedance than a characteristic impedance of a PCB line of the first path.

15. The method of claim 14, wherein the signal is a telecommunication signal used in a CDMA network.

16. The method of claim 14, wherein the second path is an RF matching path for performing an RF-matching function while reducing the power strength of the signal to a prescribed level.

17. The method of claim 14, wherein the first path is an RF matching path for performing an RF-matching function without changing the power strength of the signal.

18. The method of claim 14, further comprising:

receiving GPS satellite information through a GPS RF reception path wherein interference of the signal with the GPS RF reception performance is minimized;

calculating a pseudo-range of the mobile communication terminal by using the GPS satellite information; and transmitting the pseudo-range and the GPS satellite information from the mobile communication terminal to a position calculating base station.

19. The method of claim 18 further comprising:

switching the RF matching path of the signal to the first path.

* * * * *